United States Patent [19]

Cosby

[11] 3,919,416
[45] Nov. 11, 1975

[54] AMMONIUM SULFATE AND AMMONIUM NITRATE ADMIXTURES AS BOLL WEEVIL ERADICANTS

[76] Inventor: Harvey S. Cosby, R.F.D. No. 3, Washington, Ga. 30673

[22] Filed: Jan. 12, 1970

[21] Appl. No.: 1,956

Related U.S. Application Data

[63] Continuation of Ser. No. 574,938, Aug. 25, 1966, abandoned.

[52] U.S. Cl. .................................. 424/162; 424/166
[51] Int. Cl.² ...................................... A01N 11/00
[58] Field of Search .......................... 424/166, 162

[56] References Cited
UNITED STATES PATENTS

| | | | |
|---|---|---|---|
| 1,496,436 | 6/1924 | Steinhart | 424/166 X |
| 1,625,608 | 4/1927 | Holmes | 424/166 X |
| 2,590,054 | 3/1952 | Taylor et al. | 424/166 X |
| 3,152,879 | 10/1964 | Yale, Jr. | 71/2.2 |

*Primary Examiner*—V. D. Turner
*Attorney, Agent, or Firm*—Newton, Hopkins & Ormsby

[57] ABSTRACT

Composition of matter for eradicating any weevil worm or larvae pests which attack vegetables, fruit, plants and the like consisting of acid salts of ammonia and method of using same.

5 Claims, No Drawings

AMMONIUM SULFATE AND AMMONIUM NITRATE ADMIXTURES AS BOLL WEEVIL ERADICANTS

This application is a continuation of Ser. No. 574,938 filed Aug. 25, 1966, now abandoned.

This invention relates to a systemic poison and, is more particularly concerned with a method of and composition for eradicating pests, particularly cotton boll weevils.

Probably the most destructive and the most difficult to control of the pests which attack cotton plants is the boll weevil (*Anthonomus grandis*). In its attack, the adult boll weevil eats into the "squares" in the hub of a boll of cotton and lays eggs or larvae in the cavity thereby created. The eggs or larva, in turn, hatch into pupa which feed off of the boll until reaching maturity, at which time the boll weevil flies away to attack the squares of additional bolls and perhaps to lay additional eggs.

Quite drastic steps are usually taken to control the boll weevil in fields; however, even the most persistent pesticidal applications by spraying or dusting do not assure success. Indeed, even though calcium arsenate is a deadly poison to animals and humans, it nevertheless is employed as an insecticide against the boll weevil. In many instances, several dustings of a field with calcium arsenate or benzine hexachloride during a single season is necessary in order to control the boll weevil. Crop dusting with calcium arsenate and other insecticides is expensive, dangerous and time consuming.

Like humans and animals, boll weevils build up a tolerance to calcium arsenate, even though it has a cumulative effect thereon. Thus, the $LD_{50}$ of calcium arsenate is increasing with respect to boll weevils.

The Southern United States has long sought in vain for an effective way to eradicate the boll weevil and the state of Georgia has even offered a reward to the person discovering how to eradicate the boll weevil, and an Alabama town has erected a monument to the boll weevil due to the fact that the boll weevil was so destructive that it forced the farmers thereabout to change from raising cotton to other endeavors which proved more profitable.

The present invention is believed to supply the answer to the age-old problem of eradicating the boll weevil and boll worm. Briefly described, the present invention simply includes the fertilizing of the furrows of a plowed field (prior to planting) with a mixture of two strong acid salts of ammonia and the subsequent planting of cotton. If deemed necessary, subsequent fertilizing treatments, with the ammonium salt mixture, of the ground surrounding the growing cotton plants may be undertaken.

Surprisingly, the boll weevil apparently cannot survive attacking a plant which has been fertilized in such a manner. Nor can its pupa survive. Therefore, the cotton fertilized with the mixture of ammonium salts of the present invention will not be appreciably damaged by an attacking horde of boll weevils.

While I do not understand what takes place with respect to the killing of the boll weevil, it may be theorized that, with the high concentration of available ammonia resulting from fertilizing the cotton plants with the mixture of the strong acid salts of ammonia, the ammonium salts or some toxic derivitive thereof are present in the cellulose of the cotton plant and when ingested by the adult boll weevil when the boll weevil eats into the square, the boll weevil receives a lethal dose thereof and subsequently dies. If the boll weevil has been successful in laying its larva prior to its death, the larva may hatch into the pupas; however, upon ingestion by the pupa of the edible portions of the boll, they, too, will die.

Therefore, the cotton planted and raised according to the present invention will be subjected to only first and second generation attacks by the boll weevil and will therefore survive the attacks to produce cotton which has only been slightly damaged thereby.

More specifically, I utilize as the fertilizer a mixture of ammonium sulfate and ammonium nitrate evenly distributed in the furrows approximately 10 days prior to the planting of the cotton.

It will be appreciated that this mixture of ammonium sulfate and ammonium nitrate are acid and will tend gradually to lower the pH of the soil with continued use. Some lowering of the pH of the soil is desirable for my purposes; however, the concentration of fertilizer should not lower the pH sufficiently to prevent proper assimilation by the plant of appropriate major nutrients such as nitrogen, phosphorus, potassium, sulfur, copper, calcium, magnesium, manganese, and zinc. The lowering of the pH will not effect the assimilation of iron. Hence, the pH of the soil should not be brought below approximately 5.3 and should be preferably maintained above 5.8 during the growing period for the cotton.

The following is a specific example of a suitable system of erradicating the boll weevil:

EXAMPLE I

A combination fertilizer and pesticide was prepared by mixing together 1400 pounds of commercial sulfate of ammonia (ammonium sulfate) $(NH_4)_2 SO_4$ "AERO'-'—Ammonium sulfate 21% crystalline and 600 pounds of commercial ammonium nitrate $(NH_4 NO_3)$. The ammonium nitrate was a pelleted fertilizer containing 95% or more ammonium nitrate with no organic coating, and 33.5% nitrogen (derived from ammonium nitrate) and was designated a 33.5—0—0 fertilizer. It was known as Arcadian "Gold-an" , a product of Allied Chemical Corporation, Hopewell, Virginia.

The ground in Wilkes County, Georgia, was prepared for planting by creating parallel rows divided by deep furrows. One thousand pounds per acre of the ammonia mixture was then evenly distributed in the furrows of the ground to provide the only fertilizer employed.

The following is the analysis for the ammonium sulfate:

| Percent by weight: | | |
|---|---|---|
| N | 21 | minimum |
| $H_2O$ | 0.25 | maximum |
| Acrylamide | 0.50 | maximum |
| Typical analysis: | | Range |
| N | 21 | 21–21.1 |
| $H_2O$ | .2 | .10–.25 |
| Acrylamide | .3 | .3 – .5 |

A test crop of cotton was planted in the rows between the fertilized furrows ten days after the fertilizer treatment and a control planting of cotton was planted in rows which were not fertilized in such a manner.

The test cotton crop was periodically checked and while the control planting showed numerous boll weevils, the test cotton, fertilized as described above, contained no live boll weevils. Numerous dead boll weevils, however, were seen on the ground surrounding the test cotton crop.

EXAMPLE II

Instead of pre-mixing the fertilizer and pesticide ingredients prior to distribution in the soil, the ammonium sulfate was distributed first followed by distribution of the ammonium nitrate. In all other respects, the procedure was the same as that described in Example I with the same results being achieved.

EXAMPLE III

The procedure of Example II was followed except that the ammonium nitrate was distributed first followed by distribution of the ammonium sulfate. The same results as described in Example I were achieved.

EXAMPLE IV

The procedure of Example I was followed except that 800 pounds of ammonium sulfate and 200 pounds of ammonium nitrate were employed with the same results being achieved.

While Example I discloses only a single use of the combination fertilizer and pesticide mix which contained by weight 70% ammonium sulfate and 30% ammonium nitrate, if there were evidence of live boll weevils in the field or if there has been excessive rainfall, it may be found desirable to re-fertilize in the furrows using the above described mixture.

Furthermore, I have found not only is the mixture described above effective for creating a systemic poison in the cotton plant against the boll weevil, but it is effective for other plants and against a variety of other pests which eat into plants. In particular, the mixture is effective against a variety of worms which attack fruits and vegetables such as peaches, corn, tomatoes, pecans and the like. It is likewise effective against army worms and the cotton stinging worm.

It will be understood by those skilled in the art that while Example I discloses a single embodiment giving specific porportions of ammonium sulfate to ammonium nitrate, these proportions may be varied within the range which is effective for killing the boll weevil or other pest without undue experimentation and without departing from the scope of the present invention.

It will be obvious to those skilled in the art that many variations may be made in the one embodiment chosen for the purpose of illustrating the present invention without departing from the scope thereof as defined by the appended claims.

1. The process of limiting the damage inflicted by boll weevils to a cotton crop, which comprises the steps of:
   a. preparing a field for cotton planting;
   b. applying a mixture of ammonium sulfate and ammonium nitrate to the field in weight proportions of approximately 70 to 80 percent of the former and 30 to 20 percent of the latter;
   c. planting cotton in the field approximately 10 days subsequent to the application in step (b); and
   d. controlling the damage inflicted by boll weevils on the growing cotton to at most first and second generation attacks thereby, by controlling the application of step (b) to not less than approximately 1,000 pounds per acre whereby a first generation adult boll weevil attacking the crop will ingest a lethal dose of toxic substance whereas any second generation pupa will also ingest a lethal dose of toxic substance.

2. The process of claim 1 in which the acidity of the soil is maintained at a pH of at least 5.3.

3. The process of claim 1 in which said mixture is evenly distributed along the furrows in which the planting is to take place.

4. The process of claim 1 in which the ammonium sulfate and ammonium nitrate are mixed in solid form.

5. The process of claim 4 in which the ammonium nitrate is in the form of pellets.

* * * * *